Figure 1:
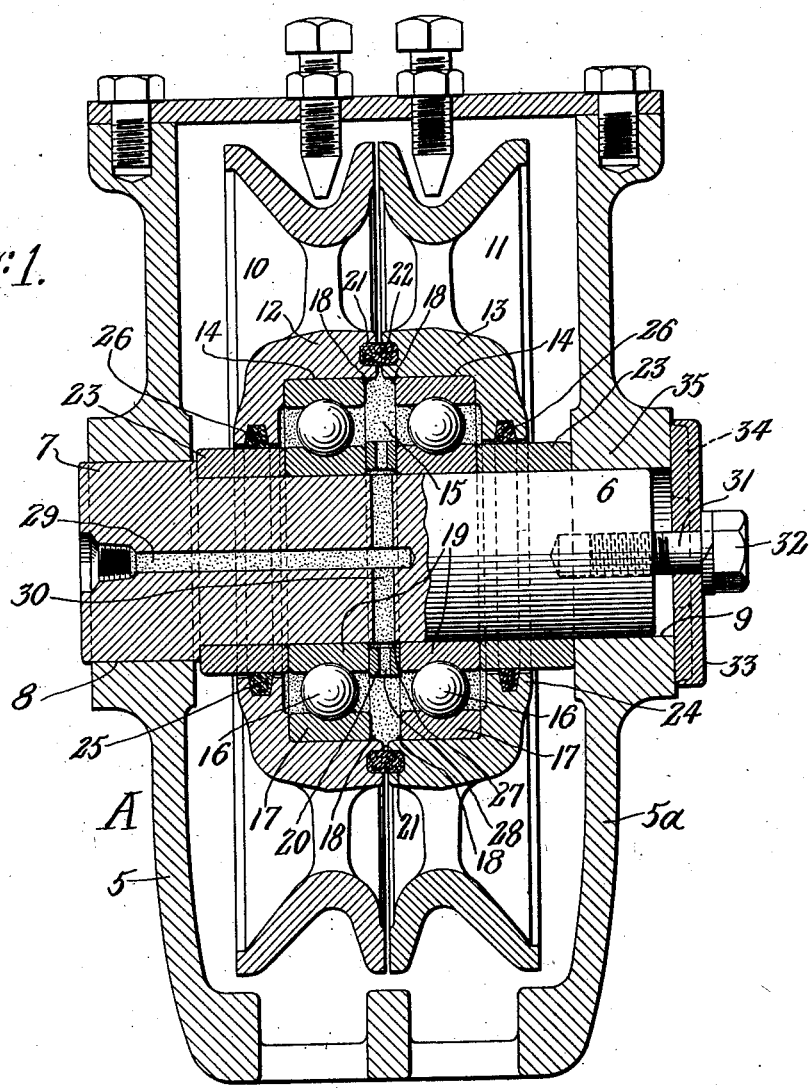

Feb. 18, 1930.  W. M. VENABLE  1,747,745
BALL BEARING SHEAVE CONSTRUCTION
Filed May 4, 1928

INVENTOR
W. M. Venable
BY
ATTORNEYS

Patented Feb. 18, 1930

1,747,745

UNITED STATES PATENT OFFICE

WILLIAM MAYO VENABLE, OF PITTSBURGH, PENNSYLVANIA, ASSIGNOR TO BLAW-KNOX COMPANY, OF PITTSBURGH, PENNSYLVANIA, A CORPORATION OF NEW JERSEY

BALL-BEARING-SHEAVE CONSTRUCTION

Application filed May 4, 1928. Serial No. 275,138.

This invention relates to an improved sheave construction which is particularly useful for application in the lever arm of certain types of excavating buckets, such, for example, as illustrated in my copending application, Serial No. 35,283, filed June 6, 1925.

Sheaves for this purpose are subject to very severe operating conditions, since the buckets are used to handle sand, gravel, dirt, etc., and frequently operate under water. For example, the difficulty of keeping water and sand out of the sheave bearings in an excavating bucket has been so great that actually no real attempt has been made to do it. Instead, the bushings and pins associated with the sheave construction have been made from the hardest kind of material obtainable, usually manganese steel, so that they would last as long as possible. But with the idea that they should be renewed every few weeks, or as often as wear made it necessary.

The primary object, therefore, of my invention is to provide a sheave construction which will have a much greater period of wear between renewals.

It is also an object of the invention to provide a construction in which satisfactory use can be made of ball bearings, such bearings not heretofore having been used in devices of this character because of the difficulties above referred to.

More specifically my invention involves the combination of an improved ball bearing support for the sheaves of an excavating bucket which is easy to manufacture at a reasonable cost, and which can be readily protected from water, sand or other extraneous matter. I also aim to provide a construction which is very easy to assemble, as well as one which can be readily replaced when necessary.

In association with the foregoing objects, I provide an improved method of lubricating the bearings.

Another object of my invention is to provide a construction which will prevent the customary slight creeping action which takes place in the course of time between the inner race of the usual type of ball bearing and the pin or other type of supporting member upon which it is mounted. A still further object of the invention is to provide a sheave construction in which there is neither radial thrust nor end thrust on any part outside of those parts which are completely sand sealed in the improved manner to be hereinafter set forth.

I also aim to provide a construction by means of which it is readily possible to adjust the distance between the rope scores in order to suit individual requirements as nearly as possible, and, further, to make it possible to use one, two, three or more sheaves, as may be desirable, and yet keep them all compactly arranged in a very small space longitudinally of the pin upon which they are mounted.

How the foregoing, together with such other objects as may appear hereinafter or are incident to my invention are obtained will appear in connection with the following description of the accompanying drawings, wherein—

Figure 2:
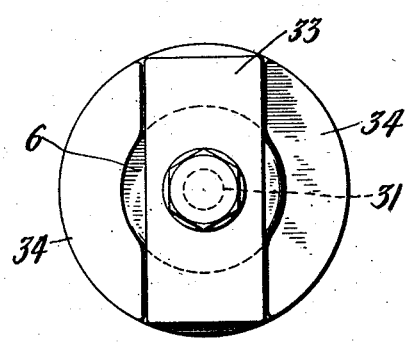

Fig. 1 is a vertical section through the end of the lever arm of an excavating bucket showing my improvements applied thereto, and Fig. 2 is a side elevation illustrating a detail of the construction.

In the drawings the end A of a typical lever arm for an excavating bucket is illustrated to show the bifurcated construction which provides the opposed supporting arms 5, 5ª. In the bucket art this portion of the lever arm is known as the sheave housing, and it is generally preferred to make the housing of a single casting so that it becomes necessary to assemble the sheaves in the housing before mounting them upon their pin.

The sheave construction proper comprises the pin 6 having, in this instance, an abutment means in the shape of a slightly enlarged head 7 at one end. Openings 8 and 9 of suitable size are formed, respectively, in the arms 5 and 5ª in order to accommodate the head 7 at one end and the shank of the pin 6 at the other end.

In the accompanying drawing an assembly including two sheaves 10 and 11 is illustrated, although I wish it to be understood that one sheave or more than two sheaves can be arranged with slight modifications according to the principles of the present invention. The sheaves illustrated are provided with hub portions 12 and 13 on the inside of each of which is machined a suitable bearing cavity 14. These cavities oppose each other as shown, and together form a chamber or housing 15 in which the ball bearings 16 are located.

The ball bearings 16 may be of any standard construction, and the outer race 17 of each bearing is firmly pressed into its cavity 14 and kept from turning therein by electric welding 18 at a suitable number of points, or simply by burring the casting with a chisel.

The inner races 19 fit snugly, but not tightly around the pin 6, and the two ball bearings are spaced apart the required distance by means of a spacer ring 20.

The adjacent faces of the hub portions 12 and 13 are also formed with opposed annular cavities 21 into which is fitted a packing 22 preferably of felt which forms a sealing means at this point.

At the outside of each inner race 19 I provide what I call a sand sealing ring 23 preferably of substantially the same thickness as the thickness of the race. The hubs are formed with the downwardly extending portions 24 which overlie the sealing rings 23 in the manner illustrated, and which are provided with annular packing cavities 25 similar to the cavities 21. Packing 26, preferably of felt, is introduced into these cavities 25, the whole arrangement constituting a sealing means between the sheave hub and the pin.

The inside diameter of the spacing ring 20 is, as shown, slightly greater than the diameter of the pin 6, so as to leave a small annular passage 27. The spacing ring is also provided with a number of radial passages 28 through which grease from the conduits 29 and 30 in the pin 6 can be forced into the chamber 15 containing the ball bearings.

My improved construction is assembled as follows: One of the sheaves, for example, the sheave 10, into which the ball bearing has already been pressed, is laid upon a table with the cavities 14 and 21 upwardly. The felt strip 22 is then inserted in the cavity 21 in the sheave 10.

The spacer ring 20 is next inserted, after which the second sheave with its ball bearings in place is brought into position with respect to the first sheave, the felt packing 22 fitting into the groove 21 as shown. Before this is done, it is preferable to fill the cavities 14 as nearly full of grease as possible, although this may be done, if desired, after the assembly is complete, by forcing the lubricant through the passages 29, 30, 28 and 27 as already described.

The felt ring 26 is then placed in the cavity 25 in the sheave 10, and the corresponding sand sealing ring 23 slipped into position. At this point it is generally customary to wire the two sheaves together to keep them from falling apart. The whole assembly is then turned over and the other felt ring 26 inserted, followed by its corresponding sealing ring 23.

The sheave unit so assembled is now ready to be inserted in the arms 5, 5ª, or it can be shipped as a unit for renewal purposes.

The total length of the assembly longitudinally of the pin is slightly less than the distance between the arms 5, 5ª, as will be seen upon an inspection of the drawing, and when the unit is placed in position between the arms, the sheave pin 6 is passed through the center in the manner shown and the parts are drawn up tightly by means of the bolt 31 which screws into the end of the pin 6 and the head 32 of which takes against the plate 33 which is kept from turning by fitting down in between the projections 34 at each side. While I have shown but one bolt 31, it is, of course, possible to use more than one bolt for this purpose, and in the larger constructions I prefer to use more than one bolt.

It will be seen that the sealing rings 23, inner races 19 and spacing ring 20 are securely clamped into position between the abutment 7 on the pin and the hub portion 35 of the arm 5ª so that none of these parts is free to rotate upon the pin 6. In this way the inner races are prevented from creeping around the pin.

The construction just described, however, is of such a nature that whenever it becomes necessary to make a repair or replacement, or to remove the bearings for any other reason, it is a practical certainty that they will never be reapplied to the pin in exactly the position which they formerly occupied. In this way sufficient change in position is brought about to provide for even wear upon the bearing structure proper without any detrimental wear between the inner races and the pin.

As before noted, while I have illustrated a pair of sheaves, the features of my invention might be incorporated where a single sheave was used, or where more than two sheaves are used. In the first instance where a single sheave was used, the sand sealing ring on the side where the bearing cavity is located would have constructed as an integral part thereof an upwardly extending portion corresponding to the hub portion of an adjacent sheave so that the chamber or housing for the bearing would be complete. In this case there would be a felt packing between the hub face of the single sheave and the adjacent face of the upstanding part of the sealing ring, as well as a packing between the other sealing ring and the downwardly extending portion of the sheave hub.

If more than two sheaves are employed, the two outside sheaves are constructed substantially as shown in the drawing, but the intermediate sheave or sheaves are provided with an open face at each side of the hub so that the chamber formed by the cavities in the hubs of all of the sheaves is a continuous chamber adapted to be fed with grease from a single source. Between each adjacent pair of hub faces there are suitable packings as before.

It is to be understood, of course, that the grooves or cavities into which the packings are fitted are machined as smooth as possible so as to permit rotation of the sheaves without injury to the packing.

In supplying the lubricant to the chamber in which the bearings are located, it is the idea to keep the chamber thoroughly full, and, in fact, to force enough grease therein so that some of it will be pressed out past the sealing means. In this way an almost perfect seal will be maintained against the entry of water, sand, grit, or dirt of any kind. Bearings constructed in this way have given a very unusually long period of service without showing any material wear.

I would like to point out that my improvement is not limited to any particular type of ball bearing, as any one of a number of types might be employed equally well.

It should also be noted that by changing the thickness of the spacer ring, it is possible to adjust the distance between the center of the sheave scores, a feature which is often of considerable importance.

All thrust, both radial and end, is taken care of by means which is thoroughly lubricated and completely sand sealed so that wear is reduced to the lowest possible degree.

I claim:—

1. The combination of a sheave pin, a plurality of sheaves mounted thereon with adjacent hub cavities forming a continuous chamber, ball bearings for the sheaves in said chamber, sealing means between sheaves and between sheaves and pin, and means for forcing lubricant into said chamber.

2. A sheave mounting comprising, in combination, opposed supporting arms, a pin extending therebetween, abutment means on the pin near one arm, ball bearings with their inner races mounted on the pin, sheaves mounted on said bearings, sand sealing rings at the outside of said races, a spacing means between races in adjacent sheaves adapted to prevent contact between the sheaves, packing means between the sheaves and between sheaves and sealing rings, and means for clamping said rings, races and spacing means between said abutment means and the other of said arms.

3. A pair of sheaves mounted for rotation adjacent to each other with opposed annular cavities in the meeting faces carrying dirt excluding packing.

4. In sheave construction, the combination of a pin, a pair of sheaves having hub portions, opposed annular cavities in said hub portions forming a bearing chamber, and ball bearings in said cavities mounted upon said pin and confined between the outer walls of said chamber.

5. In sheave construction, the combination of a pin having an abutment means thereon, a sealing ring on the pin adjacent the abutment means, ball bearing sheave means adjacent the sealing ring, a second sealing ring adjacent said ball bearing sheave means, opposed supporting arms for receiving the ends of the pin, and means for drawing the pin toward one arm of said support to clamp said parts between said arm and the abutment means on the pin.

6. In sheave construction, the combination of a pin, a pair of sheaves having hub portions, opposed annular cavities in said hub portions forming a bearing chamber, and ball bearings in said cavities mounted upon said pin and confined between the outer walls of said chamber, together with means for feeding lubricant to said chamber to lubricate both of said ball bearings.

7. The combination of a sheave pin, a pair of sheaves having hub portions, a bearing cavity in the inner face of each hub, ball bearing means in each cavity, means spacing said bearing means sufficiently far apart to prevent contact between the sheave hubs, and packing between the adjacent faces of the hubs.

8. The combination of a sheave pin, a pair of sheaves having hub portions, a bearing cavity in the inner face of each hub, a ball bearing in each cavity having its inner race mounted around said pin, a ring between the inner races spacing said bearings sufficiently far apart to prevent contact between the sheave hubs, packing between the adjacent faces of the hubs, radial lubricant passages in said ring, and means for forcing lubricant through said passages into said bearing cavities.

9. The combination of a sheave pin, a pair of sheaves having hub portions, a bearing cavity in the inner face of each hub, a ball bearing in each cavity having its inner race mounted around said pin, a ring between the inner races spacing said bearings sufficiently far apart to prevent contact between the sheave hubs, packing between the adjacent faces of the hubs, lubricant passages in said ring, and lubricant conduits in the pin communicating with said passages through all of which lubricant can be fed to the bearing cavities in said hubs.

10. The combination of a sheave pin, a plurality of sheaves mounted thereon with adjacent hub cavities forming a continuous chamber, ball bearings in said chamber for the sheaves, packing between adjacent sheave faces, a sand sealing ring at the outside of the sheave at each end, packing between said end sheaves and their respective sealing rings, and means for forcing lubricant into said chamber.

11. The combination of a sheave pin, a plurality of sheaves mounted thereon with adjacent hub cavities forming a continuous chamber, ball bearings in said chamber for the sheaves, spacing rings between bearings, sealing means between adjacent sheave faces, sealing means between the end sheaves and the pin, and means for forcing lubricant into said chamber.

12. The combination of a sheave pin, a plurality of sheaves mounted thereon with adjacent hub cavities forming a continuous chamber, ball bearings in said chamber for the sheaves, spacing rings between bearings, sealing means between adjacent sheave faces, sealing means between the end sheaves and the pin, a lubricant passage through a ring, and a lubricant conduit in the pin communicating with said passage through which lubricant can be fed to the bearing chamber and out past said sealing means.

13. In a sheave mounting, the combination of a sheave pin, opposed supporting arms, abutment means on the pin near one arm, ball bearing means on the pin between said abutment and the other arm, a sheave mounted on said bearing means, a sealing ring between the ball bearing means and the other supporting arm, and means for clamping the ball bearing means and the sealing ring between said abutment and said other arm, said pin being non-rotatively mounted in the supporting arms.

14. A sheave mounting comprising in combination, opposed supporting arms, a pin extending therebetween, abutment means on the pin near one arm, ball bearing means for a plurality of sheaves adapted to turn independently of one another with their inner races mounted on said pin, a series of sleeves mounted on said pin between and to the outside of said races, and means for clamping said races and sleeves together between said abutment means and the other of said arms by lateral movement of the pin toward said other arm, together with packing means between hubs and sleeves, said pin being non-rotatively mounted in the supporting arms.

15. A sheave mounting comprising in combination, opposed supporting arms, a pin extending therebetween, abutment means on the pin near one arm, ball bearing means for a plurality of sheaves adapted to turn independently of one another with their inner races mounted on said pin, a series of sleeves mounted on said pin between and to the outside of said races, and means for clamping said races and sleeves together between said abutment means and the other of said arms by lateral movement of the pin toward said other arm, said pin being non-rotatively mounted in the supporting arms.

In testimony whereof I have hereunto signed my name.

WILLIAM MAYO VENABLE.